US007762168B2

(12) United States Patent
Van Den Tillaart

(10) Patent No.: US 7,762,168 B2
(45) Date of Patent: Jul. 27, 2010

(54) SMART PUNCHING

(75) Inventor: Robertus C. W. T. M. Van Den Tillaart, Gemert (NL)

(73) Assignee: Océ-Technologies B.V., Venlo (NL)

( * ) Notice: Subject to any disclaimer, the term of this patent is extended or adjusted under 35 U.S.C. 154(b) by 584 days.

(21) Appl. No.: 11/081,536

(22) Filed: Mar. 17, 2005

(65) Prior Publication Data

US 2005/0204882 A1 Sep. 22, 2005

(30) Foreign Application Priority Data

Mar. 18, 2004 (EP) .................................. 04075873

(51) Int. Cl.

| | |
|---|---|
| ***B26D 1/00*** | (2006.01) |
| ***B26D 3/00*** | (2006.01) |
| ***B26D 7/06*** | (2006.01) |
| ***B26F 1/14*** | (2006.01) |
| ***B65H 33/04*** | (2006.01) |
| ***B65H 39/00*** | (2006.01) |
| ***B65H 31/00*** | (2006.01) |
| ***B42F 21/00*** | (2006.01) |
| ***G06K 1/18*** | (2006.01) |
| ***G03G 15/00*** | (2006.01) |

(52) U.S. Cl. ..................... 83/13; 83/23; 83/687; 83/86; 83/927; 270/58.07; 283/36; 271/207; 234/20; 399/82

(58) Field of Classification Search ................... 83/670, 83/687, 682, 684, 436, 437, 927, 13, 30, 83/76.9, 359, 669, 88; 234/20, 33, 59, 90, 234/91, 106, 107, 110, 112, 114, 118, 119, 234/123, 124; 270/58.07, 58.2; 271/207; 399/82, 407

See application file for complete search history.

(56) References Cited

U.S. PATENT DOCUMENTS

| | | | | | |
|---|---|---|---|---|---|
| 3,883,063 | A | * | 5/1975 | Fassman et al. | 227/21 |
| 4,141,546 | A | * | 2/1979 | Queener | 271/288 |
| 4,318,539 | A | * | 3/1982 | Lamos | 270/58.3 |
| 4,866,487 | A | * | 9/1989 | Ohuchi et al. | 399/404 |
| 4,988,085 | A | * | 1/1991 | Maekawa et al. | 270/58.11 |
| 5,018,717 | A | * | 5/1991 | Sadwick et al. | 271/207 |
| 5,037,081 | A | * | 8/1991 | Engelhardt et al. | 271/207 |
| 5,513,839 | A | * | 5/1996 | Green | 270/58.07 |
| 5,704,602 | A | * | 1/1998 | Taylor et al. | 270/1.02 |
| 5,762,329 | A | * | 6/1998 | Nakazato et al. | 270/58.09 |
| 5,848,346 | A | * | 12/1998 | Takashiro | 399/404 |
| 5,887,502 | A | * | 3/1999 | Yamaguchi et al. | 83/76 |
| 5,951,008 | A | * | 9/1999 | Williams et al. | 271/288 |
| 6,014,920 | A | * | 1/2000 | Yamauchi et al. | 83/560 |

(Continued)

FOREIGN PATENT DOCUMENTS

DE 199 08 698 A1 8/2000

(Continued)

*Primary Examiner*—Ghassem Alie
*Assistant Examiner*—Bharat C Patel
(74) *Attorney, Agent, or Firm*—Birch, Stewart, Kolasch & Birch LLP

(57) ABSTRACT

A sheet processing apparatus provided with a sheet punching device and a processor unit for controlling the apparatus, said processor unit being adapted to enable an operator to specify sheet size, sheet orientation, and hole positions in batches of sheets being processed and creating a staggered stack of sheets by stacking said batches of sheets with holes aligned.

8 Claims, 8 Drawing Sheets

U.S. PATENT DOCUMENTS

| | | | | |
|---|---|---|---|---|
| 6,029,026 | A * | 2/2000 | Natsume et al. | 399/82 |
| 6,061,150 | A * | 5/2000 | Yamamoto | 358/444 |
| 6,065,383 | A * | 5/2000 | Takaishi et al. | 83/368 |
| 6,120,015 | A | 9/2000 | Albright et al. | |
| 6,295,908 | B1 * | 10/2001 | Holzhauser et al. | 83/76.9 |
| 6,305,262 | B1 * | 10/2001 | Watanabe | 83/670 |
| 6,325,585 | B1 * | 12/2001 | Sasaki et al. | 412/11 |
| 6,345,170 | B1 * | 2/2002 | Nakazato et al. | 399/388 |
| 6,361,639 | B1 * | 3/2002 | Owen et al. | 156/211 |
| 6,386,080 | B1 | 5/2002 | Okamoto et al. | |
| 6,398,481 | B2 * | 6/2002 | Chen | 414/791.2 |
| 6,533,265 | B1 * | 3/2003 | Baldini | 271/207 |
| 6,573,974 | B1 * | 6/2003 | Ikeda et al. | 355/25 |
| 6,579,059 | B2 * | 6/2003 | Chen | 414/791.2 |
| 6,698,744 | B2 * | 3/2004 | Yamada et al. | 270/58.12 |
| 6,769,685 | B2 * | 8/2004 | Kakigi | 271/291 |
| 6,869,010 | B2 * | 3/2005 | Morson | 234/50 |
| 7,073,706 | B2 * | 7/2006 | Yaginuma et al. | 234/97 |
| 7,097,369 | B2 * | 8/2006 | Barry et al. | 400/62 |
| 7,159,862 | B2 * | 1/2007 | Matsutomo et al. | 271/3.14 |
| 2003/0007805 | A1 * | 1/2003 | Kawahira | 399/82 |
| 2003/0024361 | A1 * | 2/2003 | Kikuchi | 83/30 |
| 2003/0062666 | A1 * | 4/2003 | Hosoya et al. | 270/58.07 |
| 2003/0161004 | A1 * | 8/2003 | Bolanos | 358/1.18 |
| 2004/0061282 | A1 * | 4/2004 | Stemmle | 271/207 |
| 2004/0061891 | A1 * | 4/2004 | Philpot | 358/1.15 |
| 2004/0174551 | A1 * | 9/2004 | Kurohata et al. | 358/1.12 |
| 2005/0000336 | A1 * | 1/2005 | Hattori et al. | 83/72 |
| 2005/0022644 | A1 * | 2/2005 | Morson | 83/55 |

FOREIGN PATENT DOCUMENTS

| | | | |
|---|---|---|---|
| DE | 199 50 097 | A1 | 4/2001 |
| DE | 203 15 481 | U1 | 1/2004 |
| EP | 0 665 179 | A2 | 8/1995 |
| EP | 1 462 862 | A2 | 9/2004 |
| WO | WO 96/26047 | A1 | 8/1996 |
| WO | WO 01/76833 | A1 | 10/2001 |

* cited by examiner

SMART PUNCHING

This non-provisional application claims priority under 35 U.S.C. §119(a) on Patent Application No. 04075873.2 filed in Europe on Mar. 18, 2004, which is herein incorporated by reference.

BACKGROUND OF THE INVENTION

The present invention relates to a method for the post-processing of sheets processed by a sheet processing apparatus provided with a sheet punching device for punching a set of two or more spaced holes in sheets, wherein the method includes the step of punching the set of holes in all sheets of a first batch, in a first, standard, position, wherein the sheets of the first batch have substantially equal size and orientation.

The present invention also relates to a sheet processing apparatus provided with a sheet punching device for punching holes in a sheet member such as a sheet of paper (hereafter referred to as a sheet).

Sheet punching devices are typically installed in a sheet processing apparatus such as a printer, a photocopying machine, a facsimile or a sheet post processing apparatus connected with an image processing apparatus. The sheet processing apparatus may perform several post-processing operations including, for example, a stack operation for stacking sheets on an output tray, a staple operation for stapling sets of sheets, and a punching operation for punching a sheet or sheets with the sheet punch device.

Background sheet punch devices are divided into two types depending on the driving method for driving a punch to create a hole in a sheet, i.e., (1) a press punch method and (2) a rotary punch method. Both types of punch devices can be used in connection with the present invention.

U.S. Pat. No. 6,120,015 discloses a press punch-type sheet punching device for punching holes in sheets outputted by a printing system, with a common sheet entrance path, two separate but closely vertically superposed sheet paths, a gating system alternately gating the unpunched sheets into one of said two separate sheet paths having respective separate (but shared) components, sheet punching stations with common reciprocally, vertically driven sheet punches. The sheets are alternately stopped and the desired hole patterns are alternately punched, and the sheets ejected, in the two separate sheet paths, individually punched, or punched simultaneously as stacked sets.

U.S. Pat. No. 6,305,262 discloses a sheet punch device including one or more punching units having a rotatable punch that punches a hole in a sheet, a driving member that drives and rotates the punch member to punch a hole in a conveyed sheet, and in which the punch member punches holes in the conveyed sheet at plural places aligned in a sheet conveying direction. Also included is a control device that controls the driving member such that the punch member punches a predetermined number of holes in the conveyed sheet sequentially at predetermined positions aligned in the sheet conveying direction. The punch units may be displaced to adapt to different paper sizes and/or and hole configurations selected by an operator. The sheet punch device is part of a post processing apparatus of an image forming device. Via a graphical user interface an operator can select the number of holes per sheet from a number of standard configurations (i.e. two, three, four or five holes per sheet). The user interface also allows the operator to choose for the holes to be aligned along the height or along the width of the sheet. These choices are limited to a number of standardized positions.

Generally, punching holes in documents for filing purposes is governed by a number of national and international standards such as International standard ISO 838, US military standard MIL-STD-1160 (FSC 7530) and German industry standard DIN 821. Other national standards exist and are in use.

U.S. Pat. No. 6,065,383 also discloses a punching mechanism displaceable to any of a plurality of punching positions in order to correctly punch holes in the standardized positions in different paper sizes.

SUMMARY OF THE INVENTION

Sheets are punched in order to place them subsequently in a ring binder or the like. The document or documents in a ring binder are often organized by dividing or subdividing them into chapters or the like that are separated by inserting tabulation (TAB) or other separating sheets into the stack. These separating sheets are either inserted manually or automatically if the paper processing device is capable of inserting tab sheets automatically. However, inserting separating sheets into a printed set is at the cost of additional sheets and either additional labour or a more complex device control.

The present invention has determined that by a relatively small adaptation of the punching functionality, sheets can be made to stand out in a stack, thereby obviating any other separating elements.

On this background, it is an object of the present invention to provide a method of post-processing, i.e., punching, sheets processed by a sheet processing apparatus provided with a sheet punching device with an extended functionality.

This object is achieved by allowing an operator of the sheet processing apparatus to specify at least one second batch of sheets having substantially the same size and orientation as the sheets of the first batch, and shift the position in which a set of holes is to be punched in the sheets of the second batch to a second position, and punching the set of two or more spaced holes in the second position in the sheets of the second batch, thereby creating a staggered stack of sheets by stacking subsequent first and second batches of sheets with holes aligned, such as by placing them in a ring binder.

Accordingly, the processed sheets form a staggered stack or a stack with emulated TAB sheets. Different parts of a stack of sheets, the above-mentioned batches, such as different documents or different chapters can be separated in this way without the need for inserting TAB sheets, because the different parts have an offset with respect to one another. This makes it far more comfortable for a reader to go through the documents because the borders between the different parts are explicit, which is especially helpful when the different parts are not stapled. The processed sheets form an aligned stack with emulated tab sheets if the shift is applied to a single sheet at a time, e.g. the starting page of each document or chapter. The emulated tab sheets can also be formed by additional sheets that are inserted before the start of a new document or chapter. The emulated TAB sheets may be printed with TAB information on the part of the sheet that does not overlap with the stack.

In a preferred form, the first position mentioned above is the conventional standard position, such as required by the already mentioned industry standards ISO, DIN, etc., and the second, different punching position is a non-standard position.

The shift can be in the direction of the width or of the height of the (usually) rectangular sheets, or both, and preferably extends over a relatively small distance, such as a few millimeters, but generally not more than 2 cm.

According to a second aspect of the present invention there is provided a sheet processing apparatus comprising a sheet punching device for punching a set of two or more spaced holes arranged on an imaginary line in sheets processed by the apparatus, and further comprising a processor unit for controlling the apparatus, including the punching device, wherein the processor unit controls the apparatus in punching the set of holes in all sheets of a first batch, in a first, standard, position, the sheets of the first batch having substantially equal size and orientation. The processing apparatus also enables an operator to specify at least one second batch of sheets having substantially the same size and orientation as the sheets of the first batch, and also to specify a shift of the position in which said set of holes is to be punched in the sheets of the second batch, to a second position, and to control the apparatus in punching the set of two or more spaced holes in the second position in the sheets of the second batch, thereby creating a staggered stack of sheets, by stacking subsequent first and second batches of sheets with holes aligned, such as by placing them in a ring binder.

Accordingly, the sheet processing apparatus is capable of processing a set of sheets that is staggered or provided with TAB emulated sheets when it is afterwards placed in a ring binder—with the advantages as described above.

Further objects, features, advantages and properties of the methods, apparatus and system according to the present invention will become apparent from the detailed description.

BRIEF DESCRIPTION OF THE DRAWINGS

In the following detailed portion of the present description, the invention will be explained in more detail with reference to the exemplary embodiments shown in the drawings, wherein.

DETAILED DESCRIPTION OF THE INVENTION

In the following detailed description, a sheet processing apparatus according to the present invention in the form of a digital printer, scanner and copier will be described by the preferred embodiments.

Figure 1:
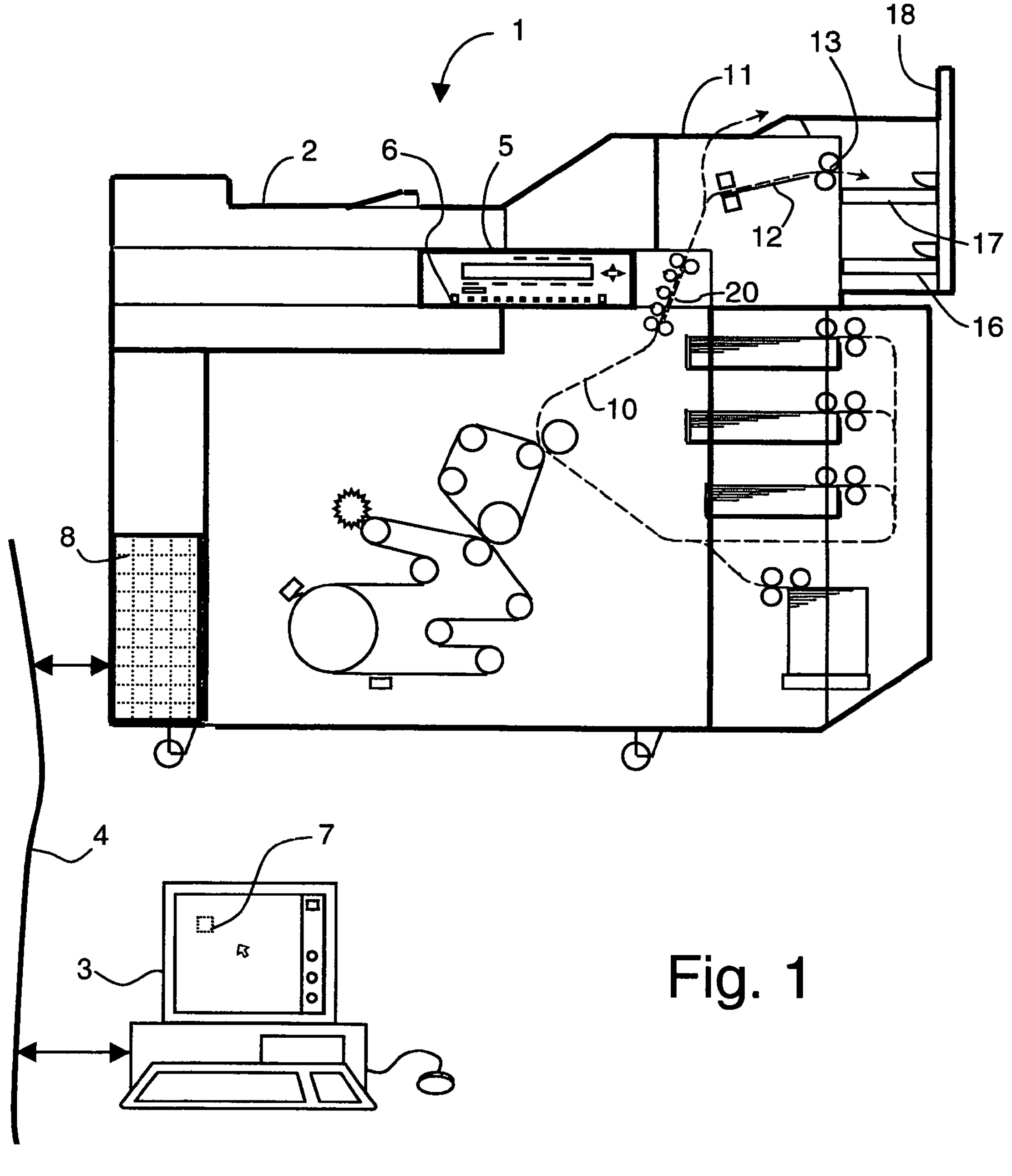
FIG. 1 illustrates a preferred embodiment of the a sheet processing device.

The printing apparatus 1 shown in FIG. 1 comprises means known per se for printing an image on a receiving sheet. These images for printing may be present on original documents which are fed to a scanning station 2 situated on top of the printing apparatus 1. Images for printing can also be fed in digital form from a workstation 3 connected via a network 4 to a control device 8 of the printing apparatus 1. A printing cycle for copying an original set fed via the scanning station 2 is started by actuating a start button 6 on the operator control panel 5 of the printing apparatus 1.

A printing cycle for printing an image set fed via workstation 3 can be started by actuating a start button 7 provided on the workstation 3, via control device 8 or by actuating a start button 6 provided on the operator control panel 5 of the printing apparatus 1.

The workstation 3 creates print orders and passes them on to printer 1. A print order contains a digital document and, in addition to digital data which determine the content of the document, can also contain data which specify the appearance of the finally printed document, such as the image supports to be used, for example sheets of paper of a specific size and color, simplex or duplex printing, finishing by stapling, gluing, punching etc.

Several workstations may be coupled, via a data network, to a print server (a suitably programmed PC), which receives print orders from the workstations, pre-processes them if necessary, and passes them on to one or more printers which are also coupled (not shown).

In the printing apparatus 1 shown in FIG. 1, the sheet transport path 10 forms the path for delivering to a sheet finishing station 11, the sheets printed in the printing apparatus.

The finishing station 11 contains a sheet punching device 20 that will be described in more detail later and a sheet collecting tray 12 (not shown in detail) in which a number of printed sheets belonging to a set can be collected and stapled, whereafter discharge roller pairs 13 feed the set to a sheet depositing device 18 forming part of a sheet depositing station.

The sheet depositing device 18 shown in FIG. 1 comprises two superposed depositing platforms 16 and 17, upon which sheets are sequentially stacked. The sheet depositing device 18 is capable of creating staggered stacks.

Figure 2:
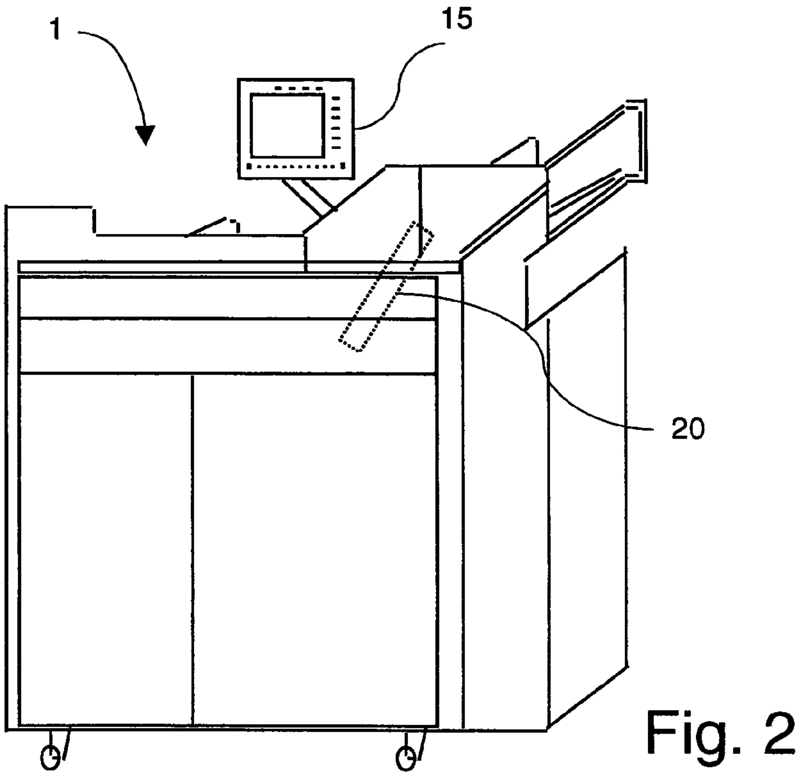
FIG. 2 illustrates another preferred embodiment of the a sheet processing device.

FIG. 2. illustrates another embodiment of the present invention by a stand alone (i.e., not connected to a network) copying machine 1 provided with an operator control unit 15 including a graphical user interface, in which a choice can be made from a number of hole punching positions. These positions include punching holes along the height or along the width of the sheet. The number of holes to be punched and their size can be selected on the operator control unit 15. The latter may also be equipped with a page programming function by means of which it is possible to make settings for each copy image. The copying machine may be digital, i.e., a combination of a scanner and a printer, but it may also be an analogue machine, i.e., a machine which images an original document directly and prints it on copying sheets.

Figure 3:
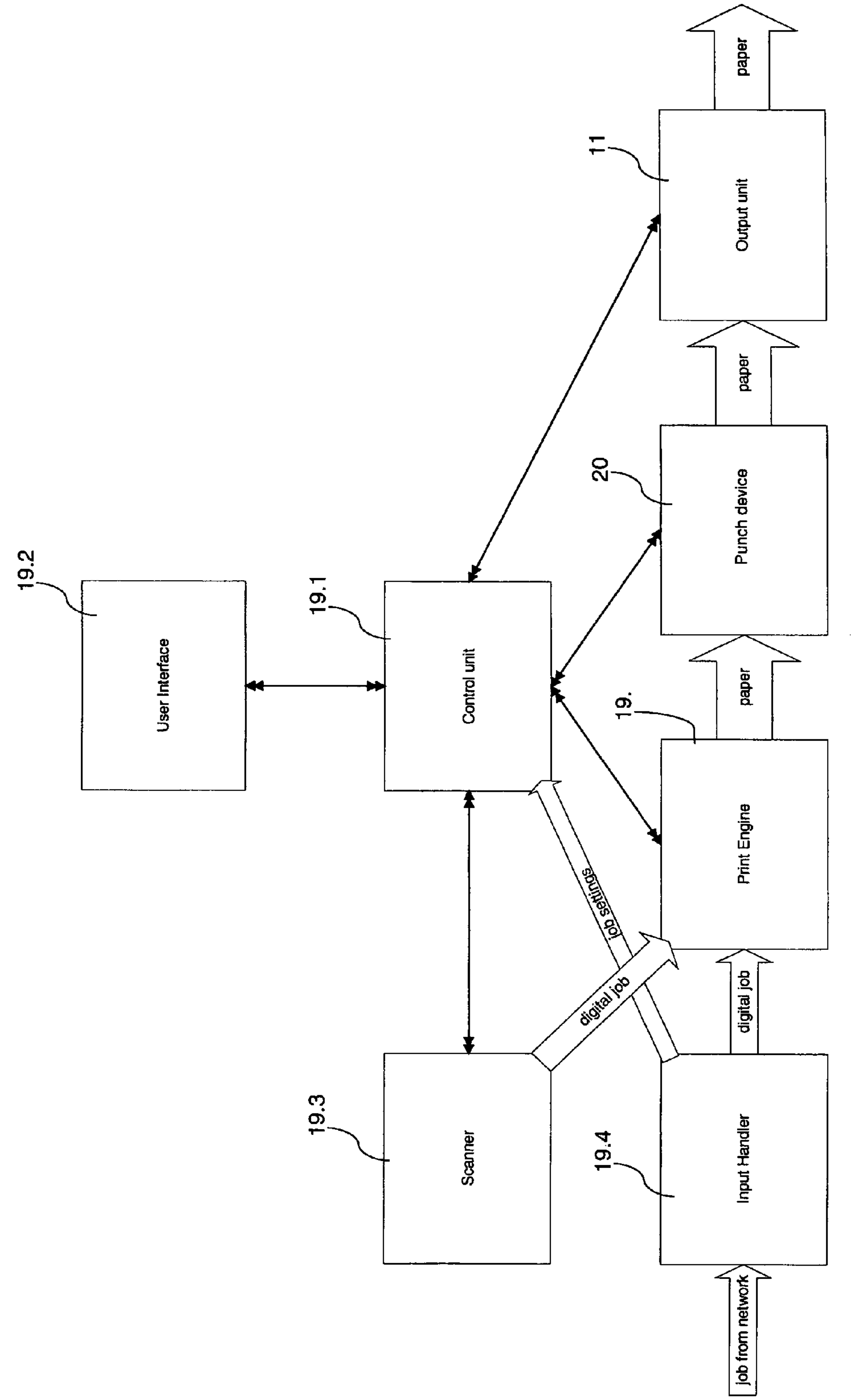
FIG. 3 illustrates the control structure of the sheet processing device, FIG. 4. is a side view of a punching device.

FIG. 3 illustrates the control structure of the sheet processing device. The control unit 19.1 controls the operation of the printer 1 and interfaces with the user interface 19.2, the scanner 19.3, the input handler 19.4, the print engine 19.5, the sheet punching device 20 and the output unit 11. The input handler 19.4 is connected to the network 4. Print jobs are received via the network by the input handler. The input handler 19.4 sends the job settings, including, e.g., punch settings to the control unit 19.1. The input handler 19.4 sends the digital job to the print engine 19.5 that prints the images on sheets. The printed sheets are then conveyed to the punching unit 20 that creates holes in the printed sheets in accordance with settings received from the control unit. The sheets are then conveyed to the output unit 11 and are treated (e.g., stapled and/or stacked) by the output unit in accordance with the settings received from the control unit 19.1.

Figure 4:
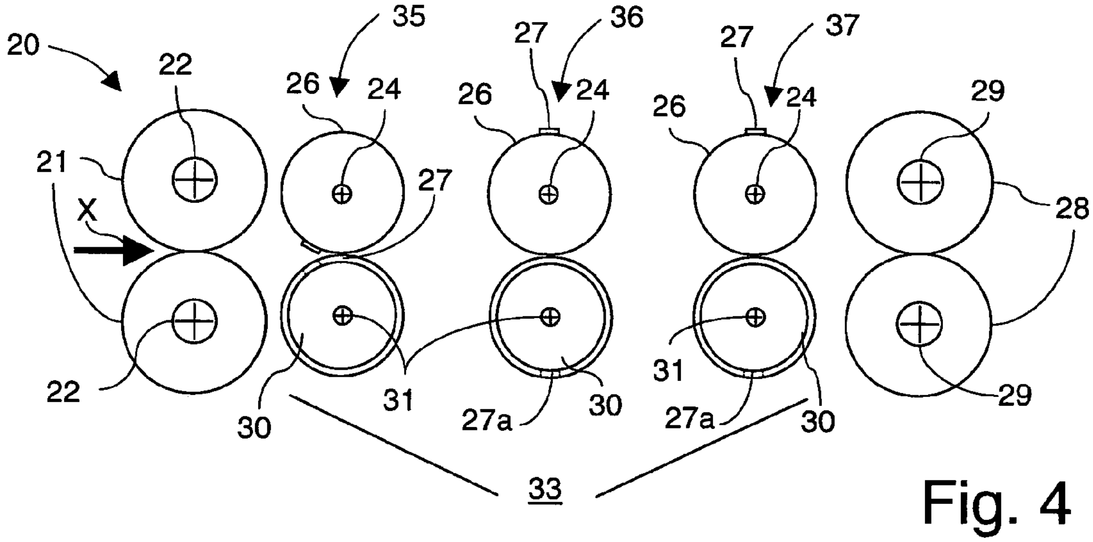
FIG. 4*a* is a enlarged section of FIG. 4.
Figure 4A:
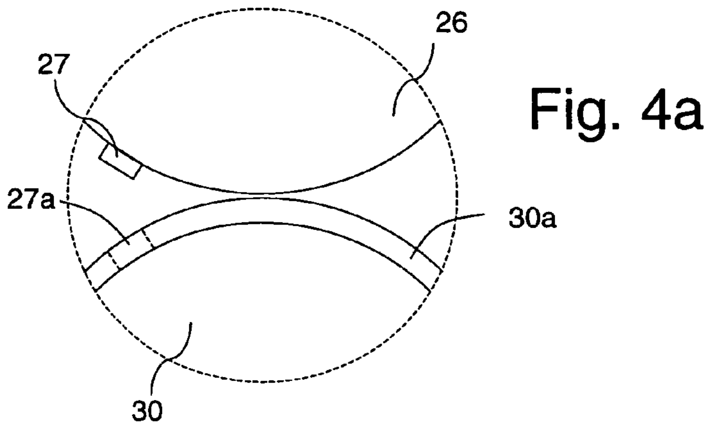
Figure 5:
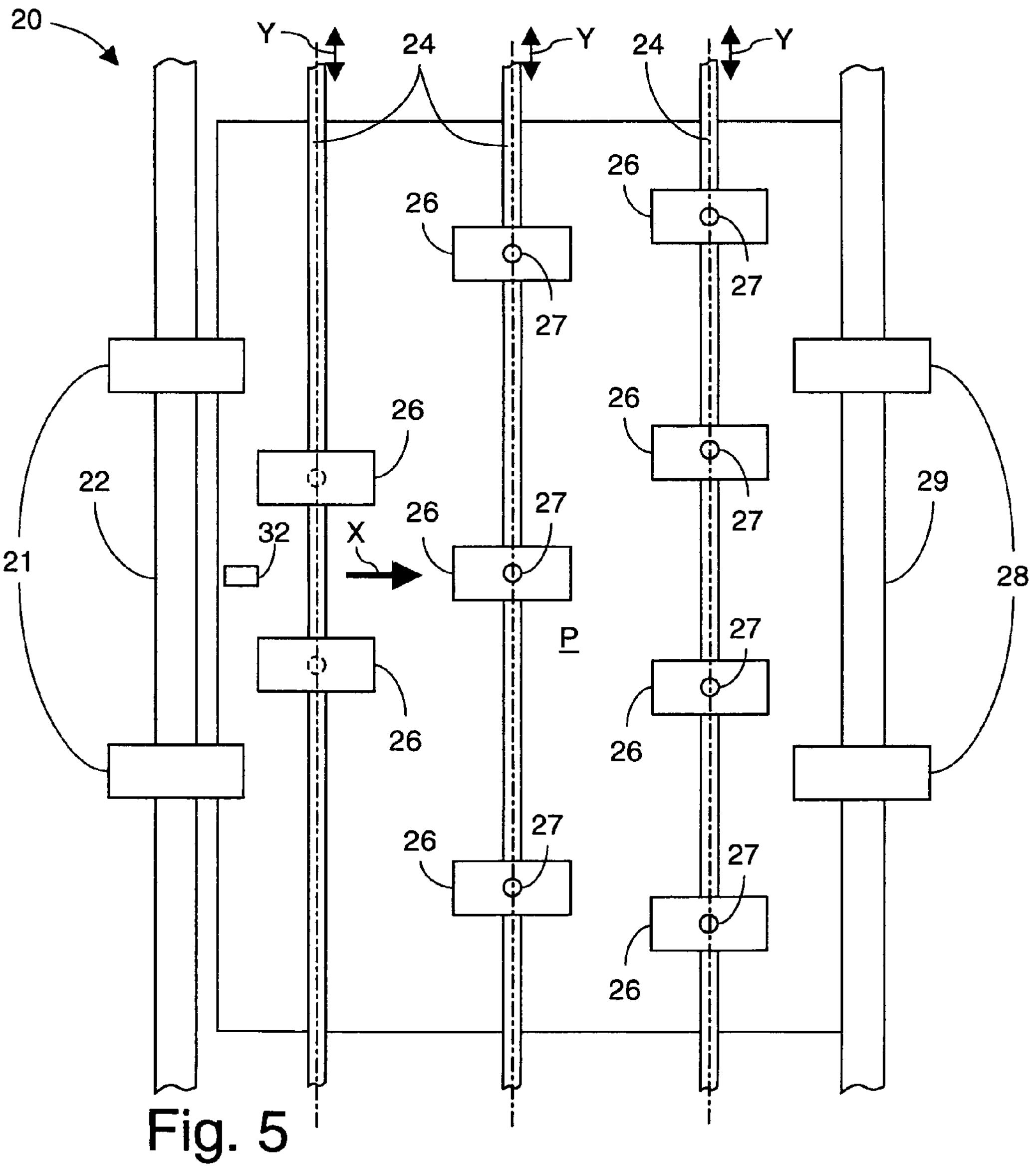
FIG. 5 is a top view of the punching device of FIG. 4.

FIGS. 4, 4*a* and 5 illustrate the sheet punching device 20 in detail. The sheet punching device 20 is placed in the sheet transport path 10. The sheets enter the punching device one by one via entry rollers 21. The sheets pass three sequentially spaced punching units 35,36 and 37, and leave the punching device one by one via exit rollers 28.

The entrance rollers 21 and exit rollers 28 each include a pair of rollers, and are rotatively supported by respective shafts 22 and 29. The shafts 22,29 extend between a pair of side boards (not shown) provided on each side of the sheet conveying path 10 of the sheet post-processing apparatus 11, and oppose each other in the direction perpendicular to the sheet conveying direction indicated by an arrow X (hereinafter referred to as a sheet width direction X). The entrance rollers 21 receive a sheet and transfer the sheet in the downstream direction of the sheet conveying path 10. The exit rollers 29 are provided immediately downstream of the rotary punching units 35, 36 and 37, and transfer the sheet conveyed in the downstream direction of the sheet conveying path 10 towards the sheet collecting tray 12 (FIG. 1).

The entrance rollers 21 and the exit rollers 29 are in a relationship wherein a rotational force is transmitted to each other via a rotational force transmission device, such as a timing belt (not shown) and a belt pulley (not shown). The entrance rollers 21 and the exit rollers 29 are driven to rotate by a sheet conveying/driving device, such as a stepping motor (not shown).

An entry sensor 32 connected to the control unit is disposed just downstream of the entry rollers 21 to detect leading and trailing edges of the sheet conveyed from the discharging rollers 21, and thus serves as a sheet edge detecting device.

Each punching unit 35,36,37 includes pairs of cooperating rollers 26,30 between which the sheets pass. The rollers 26,30 of a pair are spaced sufficiently apart for the sheets to pass in between without the rollers getting a grip on the sheets. The upper roller 26 is provided with a punch 27 and the lower roller 30 forms a die member with recess 27*a*. As shown in more detail in FIG. 4*a*, the recess 27*a* is placed in the rim 30*a* of the roller 30, and allows punching dust (not shown), that is produced when a sheet is punched, to leave the die.

The upper roller 26 is placed on a drive shaft 24, driven by an electric punch motor, such as a stepper motor (not shown) connected to the control unit. The lower roller 30 is placed on a drive shaft 31 that is connected to drive shaft 24 by a set of equally sized gearwheels (not shown). Rotations of the punch motor cause the upper roller 26 and the lower roller 30 to rotate in opposite directions respectively synchronizing with each other. The rotational position and speed of the rollers 26, 30 can be accurately controlled with the punch motor.

Punching unit 35 is provided with two pairs of rollers 26,30 and is configured for punching two holes simultaneously. Punching unit 36 is provided with three pairs of rollers 26,30 and is configured for punching three holes simultaneously and punching unit 37 is provided with four pairs of rollers 26,30 and is configured for punching four holes simultaneously.

The punching units can be provided with any other desirable number of sets of rollers in order to produce other numbers of holes simultaneously.

The sheet punching device can also be provided with a punching unit with a single pair of rollers (not shown), preferably the first punching unit after the entry rollers, that is, capable of punching several holes on an imaginary line aligned with the sheet conveying direction X in a sequential manner by two or more rotations of the punching unit concerned.

A container 33 below the punching units 35,36 and 37 receives the punch dust.

A moving mechanism using e.g. an electromagnet (not shown) associated with each of the punching units 35,36 and 36 moves the punching unit concerned in the sheet height direction Y, i.e., perpendicular to the sheet conveying direction X. The moving mechanism is connected to the control unit and the axial position of the punching units can be changed with a signal from the control unit to the moving mechanism of the punching unit concerned.

Figure 6:
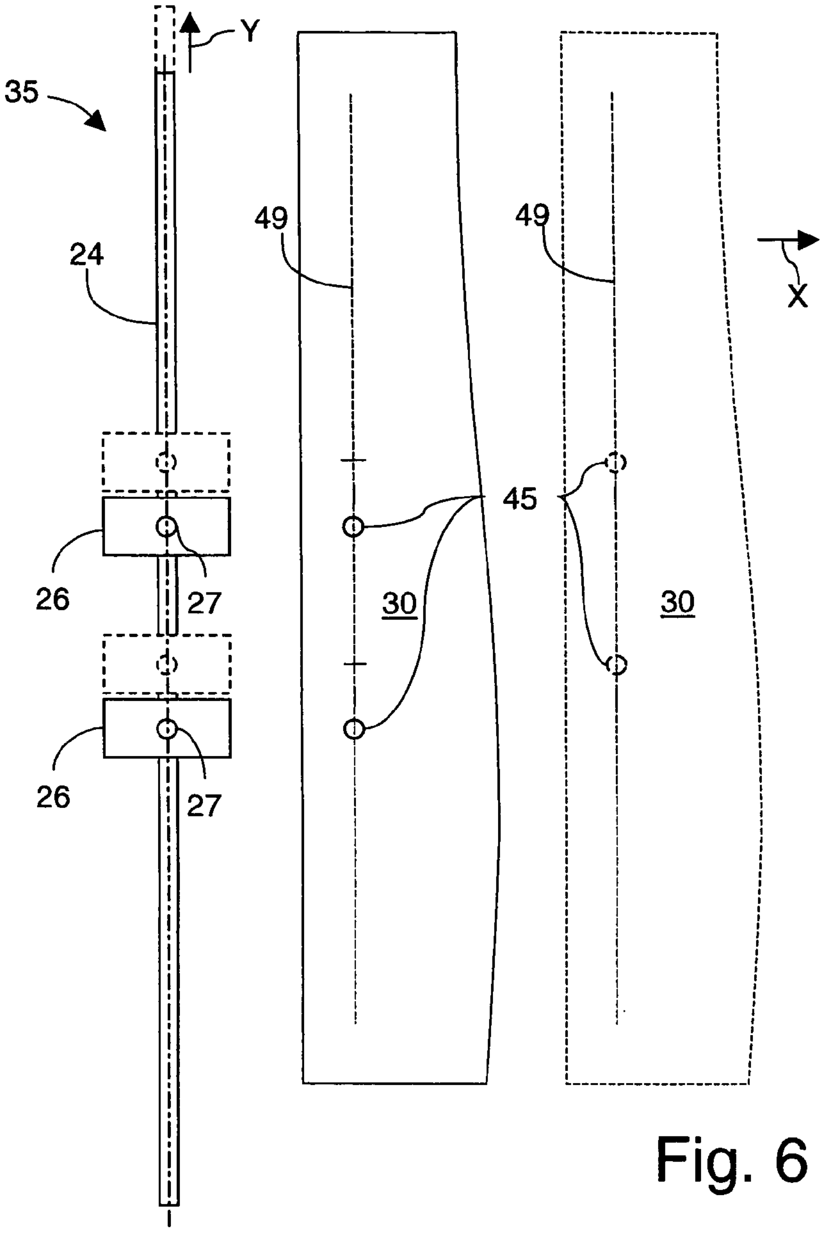
FIG. 6 shows a detail of the punching device of FIG. 4.

FIG. 6 shows in detail how the punching unit 35 can be shifted from a first punching position, illustrated by the dashed line style, to a second punching position illustrated by the solid line style, in the direction of the arrow Y by the moving mechanism. A sheet 30 punched with the punching unit 35 in the first position is illustrated in the dashed line style. This position corresponds to a conventional standard punching position, such as defined in ISO 383 or other industry standards. A sheet 30 punched with the punching unit 35 in the second position is illustrated in the solid line style. The two holes are punched on an imaginary line 49. A set of crosses indicates the first (standard) punching position, in which each hole is placed at an equal distance from the sheet symmetry line along arrow X. The second punching position is displaced downwards with respect to the standard punching position, such that the sheet will stick out of the stack upwardly, when placed in a ring binder. Of course, other shifts may be chosen.

The sheets enter the punching device one by one through exit rollers 21 and sheets do not stop during the punching operation but move along the sheet conveying path at normal speed. When it is chosen to have two holes in the document, punching unit 35 with the two punches 27 is active. The other punching units 36 and 37 are not active, so their punch 27 is in an upper position as show in FIG. 4.

The control unit synchronizes the activation of the punching unit 35—on the basis of the signal from the entry sensor 32—with the movement of the sheet along the sheet conveying path 10, to place the holes correctly in the X-direction. The punching position can be shifted in the X-direction by changing the synchronization, i.e. by delaying the activation of the punching unit, the punching position moves to the left, and by advancing the activation of the punching unit the punching position moves to the right.

If an offset in the Y-direction is needed the punching unit concerned is moved along its longitudinal axis by the moving mechanism with the offset distance needed. The offset can also be in both the X-and the Y-direction (not shown).

Figure 7:
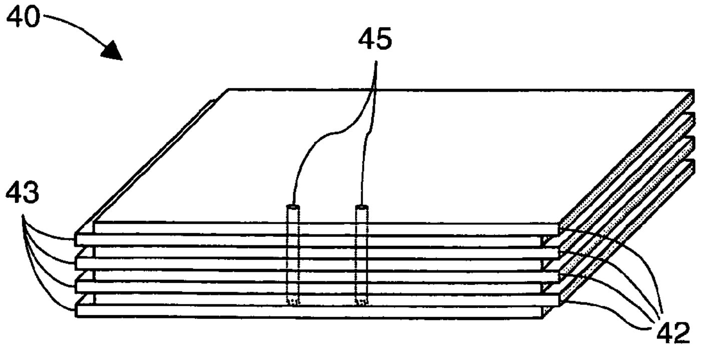
FIG. 7 illustrates a staggered stack with aligned punching holes.

FIG. 7 illustrates a stack 40 of sheets processed by the printing apparatus 1. The sheet depositing device 18 has created a staggered stack so that different parts of the stack can be easily identified. The stack comprises parts 42 that are not shifted and parts 43 that are shifted to the left (as in FIG. 7).

The punching device 20 has punched the holes 45 in different positions for the different parts of the stack. Parts 42 have been punched at the central standard two hole-punching position. Parts 43 have been punched with a shift from the central standard two hole-punching position in the Y-direction to the right (right as in FIG. 7). Also contemplated within the scope of the present invention is shifting each of the two punching positions over an equal distance in opposite directions from the standard position, which results in a more central placing of the overall stack in the binder.

Obviously, the punching displacement does not necessarily have to be equal to the stacker offset, but if it is, it brings convenience to the user who wants to put the complete pack in a ring binder or the like.

The offset between the parts 42 and 43 is equal to the distance between the two punching positions. The holes in the sheets are therefore aligned for the complete stack.

Figure 8:
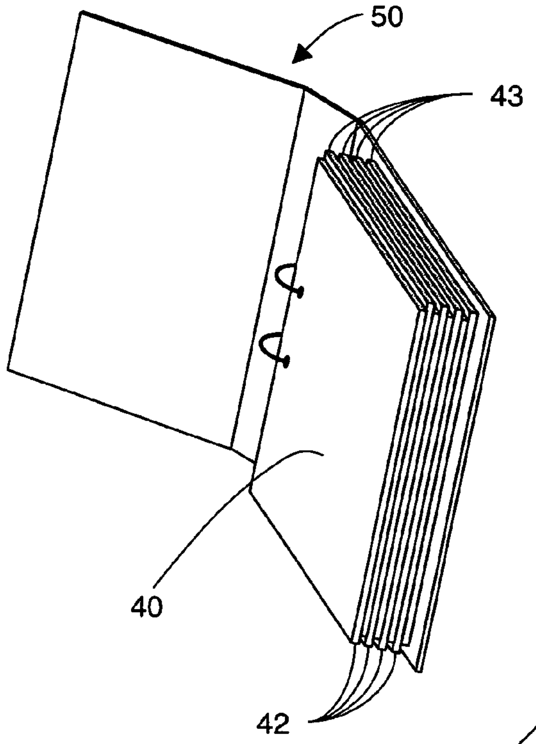
FIG. 8 illustrates the staggered stack of FIG. 7 placed in a ring binder.

FIG. 8 illustrates the stack 40 placed in a ring binder 50. The offset between the parts 42 and 43 is maintained in the ring binder 50 and the parts 42 and 43 of the stack can be conveniently identified by a user without having to add TAB sheets.

Figure 9:
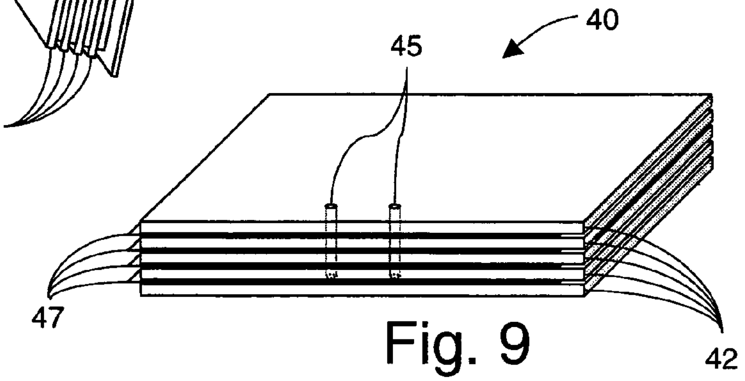
FIG. 9 illustrates a stack provided with emulated TAB sheets and aligned punching holes.
Figure 10:
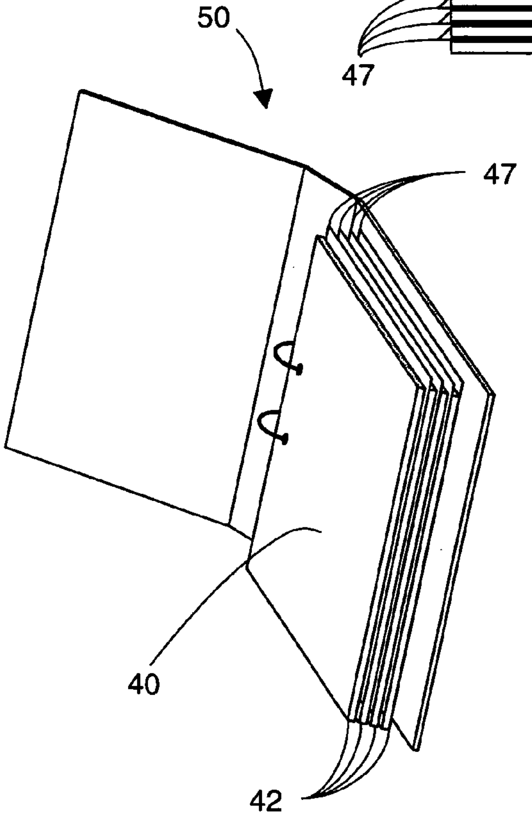
FIG. 10 illustrates the stack of FIG. 9 placed in a ring binder.

FIG. 9 illustrates a stack in which only single sheets have been punched in a different punching position, in order to allow them to emulate TAB sheets. FIG. 10. illustrates the stack of FIG. 9 placed in a ring binder 50.

Figure 11:
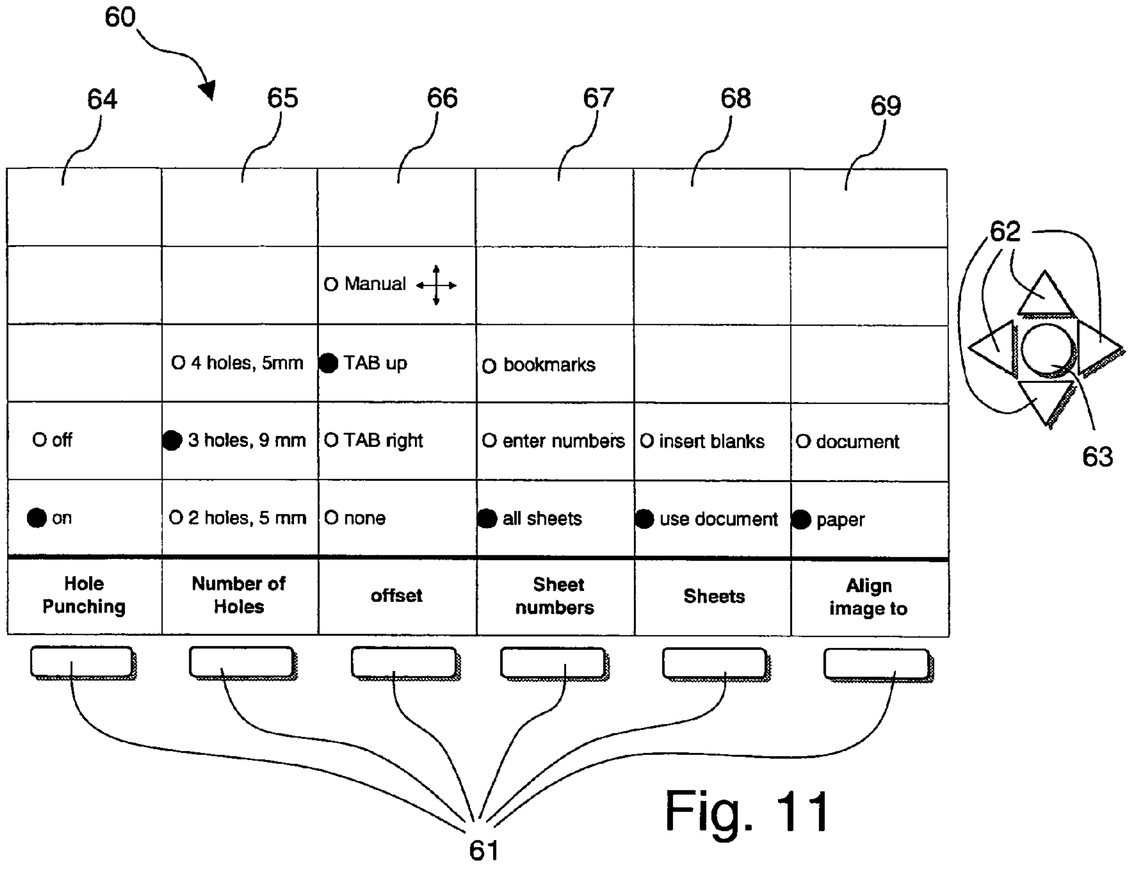
FIG. 11 illustrates a user interface of a control unit on a sheet processing device.

FIG. 11 illustrates the user interface of the control unit 5 (FIG. 1) or 15 (FIG. 2). The control unit comprises a display 60, and a keypad. The keypad comprises a line of six keys 61 placed under the display and a star shaped set of keys including four triangular navigation keys 62 and a round selection key 63.

The controller unit displays a control menu and information about the status of the printing unit on the display. The control menu gives access to the settings of the printing apparatus via a number of sub-menus. The punching settings sub-menu is shown in FIG. 11. The punching settings sub-menu comprises six columns 64,65,66,67,68 and 69, one above each key 61. Each column relates to a different aspect of the punching settings and is vertically divided into five fields. By pressing the key 61 below a column the marked setting changes from field to field in an endless loop manner.

Column 64 relates to the activation of the hole punching feature. The lowest field of the column contains an "on" setting, the field there above contains an "off" setting.

Column 65 relates to the number of holes per sheet and the associated hole size. The lowest field of the column contains a "2-holes, 5 mm" setting, the field there above contains a "3-holes, 9 mm" setting and the field there above contains a "4-holes, 5 mm" setting.

Column 66 relates to the shift in punching position. The lowest field of the column contains a "none" setting, in which the holes are punched in the central standard position. The field thereabove contains a "TAB right" setting in which selected sheets in a print job are punched with a punching position that is shifted in the X-direction relative to the other sheets in the print job concerned. The distance of the shift between the standard position and the shifted position may be a pre-programmed manufacturer setting of the printer, or may be a device default, set by a key operator, and should be in the order of a few millimeters. In order to prevent the holes from tearing, the shift should not be more than about 6 mm. The field thereabove contains a "TAB up" setting in which selected sheets in a print job are punched with a punching position that is shifted in the Y-direction relative to the other sheets in the print job concerned. Generally, the shift distance would again be a pre-programmed setting. There can also be offered several shifted positions in one and the same direction, e.g. 6 mm up relative to the standard position and 12 mm up relative to the standard position.

The highest field contains a "manual" setting. Upon activating this setting a pop up window (not shown) appears showing the X- and Y-shift distance. The X- and Y-shift distances can be adjusted by using the triangular navigation keys 62. When the desired settings have been reached the setting can be activated by pressing the round selection key 63.

Column 67 relates to the selection of the sheets to be punched in the shifted position. The lowest field of the column contains an "all sheets" setting, in which all the holes are punched in a shifted position. This feature is, e.g., useful when a document needs to be added to a conventional stack of sheets within a ring binder, because the shifted punching position will let it easily be identified as the "added" document. The field thereabove contains a "enter numbers" setting for selecting the page numbers at which a shift in punching position has to take place. Upon activating this setting a window pops up prompting the user to enter the desired sheet numbers with a numerical keypad (not shown). After completing the numeric entry the setting is activated by pressing the round selection key 63. The field there above contains a "bookmarks" setting. This setting informs the sheet punch device to shift punching position at every bookmark in the printing job. After activating this feature a pop up window displaying the page numbers of the bookmarked pages appears for providing feedback to an operator.

Column 68 relates to the insertion of extra sheets when single TAB sheets are emulated. The lowest field of the column contains a "use document" setting, in which the TAB sheets are created from sheets of the document to be printed. The field thereabove contains an "insert blanks" setting in which the TAB sheets are created from sheets that are added to the document to be printed.

Column 69 relates to the alignment of the printed images. The lowest field of the column contains a "paper" setting, in which the images are aligned with the paper, i.e. in the resulting staggered stack in a ring binder the printed images will, like the sheets, shift relative to the ring binder. The field thereabove contains a "document" setting in which the images are aligned with the document, i.e. in the resulting staggered stack in a ring binder the printed images of all pages will be aligned with the ring binder, and not shift like the sheets. This is achieved by shifting the position of printed image in the same direction and over the same distance as the shift in the punching position of the holes so that the images on all the sheets in the stack are aligned when the holes of all the sheets are aligned. A reader browsing the stack will thus not experience any jumps in image position.

Figure 12:
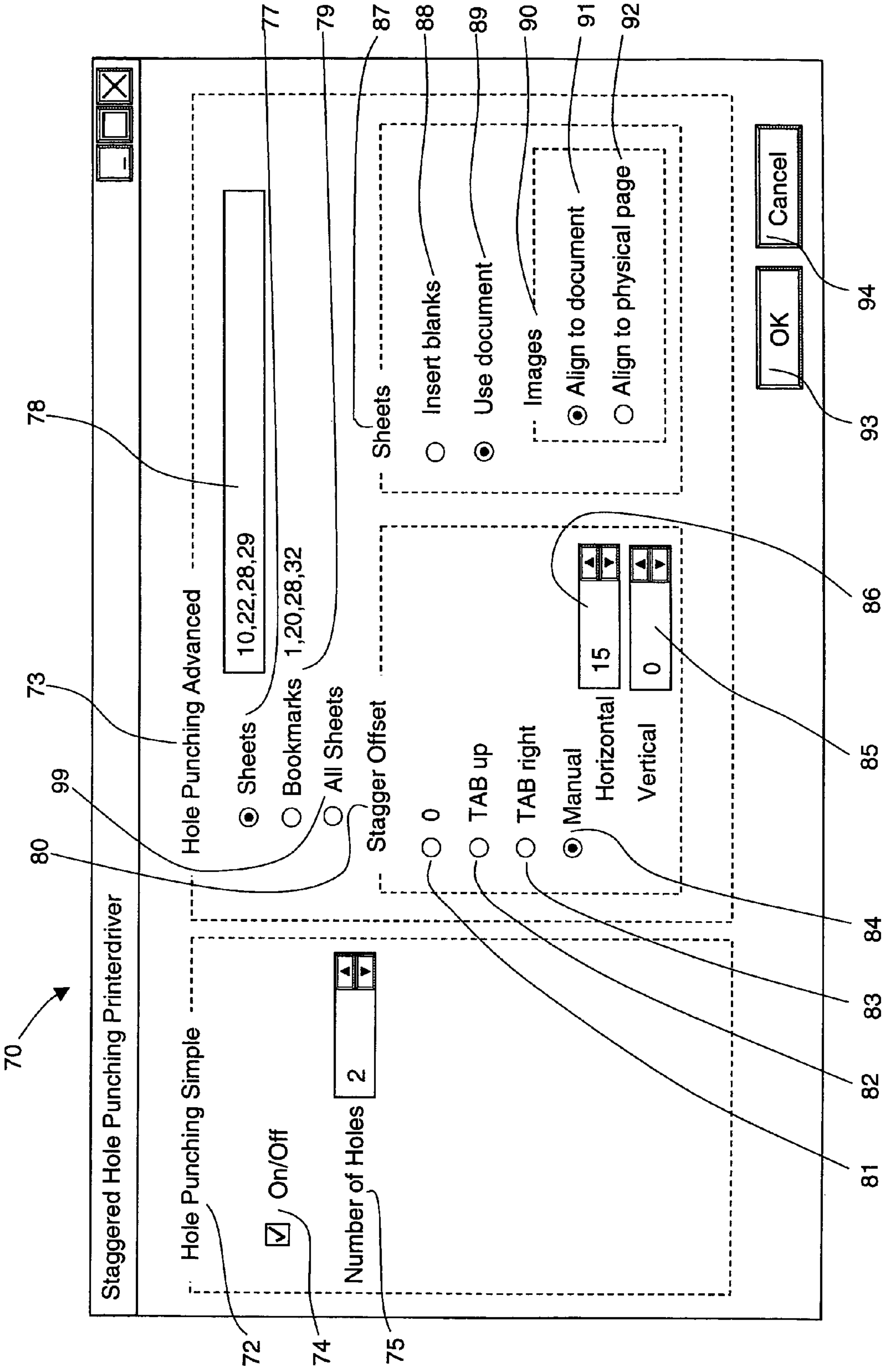
FIG. 12 illustrates a user interface of a control unit on a workstation.

The same settings as described with reference to FIG. 11 can be specified at the workstation 3. Since the same settings are involved, the effect of the settings will not again be explained in detail. FIG. 12 illustrates a user interface of a control unit on a workstation 3 in the form of a window 70 of the printer driver that pops-up after clicking with a mouse button on a "Punching" option in the printer driver. The pop-up window is divided in a "Simple hole punching" settings section 72 on the left and an "Advanced hole punching" setting section 73 on the right.

The "Simple hole punching" settings section 72 contains an "On/Off" check box 74 for specifying if the hole punching feature is to be activated and a "Number of holes" selection box 75.

The "Advanced hole punching settings" section 73 contains a "Sheets" selection item 77 with a numeric entry box 78 and a "Bookmark" selection item 79 with a page display area showing the operator which pages in the print job are bookmarked. Finally, the selection item 99 ("All Sheets") allows the operator to select a punch position shift for the entire document.

The "Advanced hole punching settings" section 73 contains further a "Stagger offset" sub-section 80 and a "Sheets" subsection 87. The "Stagger offset" sub-section 80 contains a "0" item 81 for selecting the standard position, a "TAB up" item 82, a "TAB right" item 83, and a "Manual" item 84 with a "Horizontal" selection box 85 and a "Vertical" selection box 86. These items correspond in function to the items in column 66 of FIG. 11. The "Sheets" subsection 87, which corresponds to column 68 of FIG. 11, contains an "Insert blanks" item 88 and a "Use document" item 89, and an "Images" sub-sub-section 90, which corresponds to column 69 of FIG. 11 and contains an "Align to document" item 91 and a "Align to physical page" item 92.

When the operator has specified all the punching settings he/she can return to the printer driver by clicking on the "OK" button 93 and the punching settings are programmed into the print order. Alternatively, the operator clicks on the "Cancel" button 94 and any changes to the settings are not stored.

The invention has been disclosed with reference to a single feed sheet processing device. The invention can however equally be applied to continuous feed sheet processing devices.

The shape of holes does not need to be round, e.g., squared holes can be used. The number of holes per sheet is not limited to the numbers described in the above embodiments, e.g. 5, 17 and 23 holes per page can also be used. The holes do not need to be on one imaginary line, and the holes do not need to be placed near the edge of the sheet, e.g. a set of holes can be punched close to each side of a symmetry line of a sheet that is placed in a ring binder while folded over on the symmetry line concerned.

The present invention can also be used in a punching device that also applies plastic reinforcing rings on the sheets around the holes, to prevent tearing of the punched holes.

Although the invention has been disclosed with reference to a rotary punching device, a press punch device with a displaceable punching position could also be used. As in the rotary punching device, a punching position shift in the direction perpendicular to the sheet transport direction would be accomplished by a physical shift of the punching device in that direction, whereas a punching position shift in the direction of the sheet transport can easily be accomplished by a timing shift.

While the preferred embodiments of the devices and methods have been described with reference to the environment in which they were developed, they are merely illustrative of the principles of the invention. Thus, other embodiments and configurations may be devised without departing from the spirit and scope of the appended claims.

What is claimed is:

1. A sheet processing apparatus comprising a print engine, a sheet punching device for punching a set of two or more spaced holes arranged on an imaginary line in sheets processed by the apparatus, and further comprising a processor unit for controlling the apparatus, including the punching device, wherein the processor unit controls the apparatus in punching the set of holes in all sheets of a first batch, in a first position, the sheets of the first batch having substantially equal size and orientation, said processor unit enabling an operator of the sheet processing apparatus to specify:

at least one second batch of sheets having substantially the same size and orientation as the sheets of the first batch, a shift of the position in which said set of holes is to be punched in the sheets of the second batch, to a second position, and a shift of the position of any printed images, for aligning the images on all sheets when the holes of all sheets are aligned, and to control the apparatus in printing shifted images and punching the set of two or more spaced holes in the second position in the sheets of the second batch, thereby creating a staggered stack of sheets with the images on all sheets aligned, when subsequent first and second batches of sheets are stacked with holes aligned, when placing them in a ring binder; wherein a specified second batch of sheets is a sub-set of a processing job, for creating a staggered stack of documents with aligned holes.

2. The sheet processing apparatus according to claim 1, wherein the specified second batch of sheets includes all sheets of a processing job.

3. The sheet processing apparatus according to claim 1, further comprising an user interface configured for:

specifying a number of holes to be punched, specifying the punching position, specifying a punching position shift, and specifying at which sheets a shift in the punching position has to take place.

4. The sheet processing apparatus according to claim 3, wherein the user interface is remotely connected to the sheet processing device via a local network.

5. A sheet processing apparatus comprising a sheet punching device for punching a set of two or more spaced holes arranged on an imaginary line in sheets processed by the apparatus, and further comprising a sheet depositing device and a processor unit for controlling the apparatus, including the sheet depositing device and the punching device, wherein the processor unit controls the apparatus in punching the set of holes in all sheets of a first batch, in a first position, the sheets of the first batch having substantially equal size and orientation, said processor unit enabling an operator of the sheet processing apparatus to specify:

at least one second batch of sheets having substantially the same size and orientation as the sheets of the first batch, and a shift of the position in which said set of holes is to be punched in the sheets of the second batch, to a second position, to control the apparatus in punching the set of two or more spaced holes in the second position in the sheets of the second batch, and to control the apparatus in depositing the processed sheets in the sheet depositing device in a staggered stack with the punching holes aligned; wherein a specified second batch of sheets is a sub-set of a processing job, for creating a staggered stack of documents with aligned holes.

6. The sheet processing apparatus according to claim 5, wherein the specified second batch of sheets includes all sheets of a processing job.

7. The sheet processing apparatus according to claim 5, wherein a specified second batch of sheets is a single sheet, for creating single sheets standing out, emulating tab-sheets.

8. The sheet processing apparatus according to claim 5, further comprising an user interface configured for:

specifying a number of holes to be punched, specifying the punching position, specifying a punching position shift, and specifying at which sheets a shift in the punching position has to take place.

* * * * *